United States Patent
Dhuse et al.

(10) Patent No.: US 10,585,750 B2
(45) Date of Patent: Mar. 10, 2020

(54) SLICE-EMBEDDED OBJECT METADATA

(71) Applicant: INTERNATIONAL BUSINESS MACHINES CORPORATION, Armonk, NY (US)

(72) Inventors: Gregory R. Dhuse, Chicago, IL (US); Adam M. Gray, Chicago, IL (US); Ravi V. Khadiwala, Bartlett, IL (US); Wesley B. Leggette, Chicago, IL (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 15/828,995

(22) Filed: Dec. 1, 2017

(65) Prior Publication Data
US 2019/0171521 A1 Jun. 6, 2019

(51) Int. Cl.
*G06F 11/00* (2006.01)
*G06F 11/10* (2006.01)
*G06F 3/06* (2006.01)

(52) U.S. Cl.
CPC .......... *G06F 11/1076* (2013.01); *G06F 3/064* (2013.01); *G06F 3/065* (2013.01); *G06F 3/067* (2013.01); *G06F 3/0619* (2013.01)

(58) Field of Classification Search
None
See application file for complete search history.

(56) References Cited

U.S. PATENT DOCUMENTS

| | | |
|---|---|---|
| 8,656,253 B2 | 2/2014 | Leggette et al. |
| 8,782,439 B2 | 7/2014 | Resch |
| 8,965,939 B2 | 2/2015 | Leggette et al. |
| 9,110,593 B2 | 8/2015 | Resch |
| 9,430,336 B2 | 8/2016 | Motwani et al. |
| 9,558,067 B2 | 1/2017 | Resch et al. |
| 10,069,914 B1 * | 9/2018 | Smith ................ H04L 67/1097 |

(Continued)

FOREIGN PATENT DOCUMENTS

WO 2012170255 A1 12/2012

OTHER PUBLICATIONS

S. Koh et al., "Understanding system characteristics of online erasure coding on scalable, distributed and large-scale SSD array systems," 2017 IEEE International Symposium on Workload Characterization (IISWC), Seattle, WA, 2017, pp. 76-86. (Year: 2017).*

(Continued)

*Primary Examiner* — Daniel F. McMahon
(74) *Attorney, Agent, or Firm* — Anthony M. Pallone (57) ABSTRACT

An embodiment of the invention includes a method, computer program product and system for object data storage. The embodiment includes receiving a data object for storage within a set of dispersed storage units. The data object includes object data and associated object metadata. The embodiment includes replicating the object metadata of the received data object to create more than one copy of the associated object metadata. The embodiment includes encoding the received data object to produce a plurality of data slices. The encoding includes dispersed storage error encoding. The embodiment includes appending a copy of the associated object metadata to each data slice within the plurality of data slices. The embodiment includes transmitting the plurality of data slices to the set of dispersed storage units.

17 Claims, 5 Drawing Sheets

(56) References Cited

U.S. PATENT DOCUMENTS

| | | | |
|---|---|---|---|
| 2010/0306269 A1* | 12/2010 | Osmond | G06F 3/0619 |
| | | | 707/792 |
| 2012/0311345 A1 | 12/2012 | Dhuse et al. | |
| 2012/0311557 A1 | 12/2012 | Resch | |
| 2015/0106401 A1 | 4/2015 | Canessa et al. | |
| 2016/0191509 A1* | 6/2016 | Bestler | G06F 16/2255 |
| | | | 713/163 |
| 2016/0321338 A1 | 11/2016 | Isherwood et al. | |
| 2017/0031761 A1* | 2/2017 | Horan | G06F 16/122 |

OTHER PUBLICATIONS

Mell et al., "The NIST Definition of Cloud Computing", NIST, Sep. 2011, 7 Pages, Special Publication 800-145, U.S. Department of Commerce, Gaithersburg, MD.

Pending U.S. Appl. No. 15/718,200, entitled "Encryption of Slice Partials", filed Sep. 28, 2017, 34 Pages.

Pending U.S. Appl. No. 15/341,456, entitled "Systematic Erasure Code Encoding of Data Packages", filed Nov. 2, 2016, 69 Pages.

Pending U.S. Appl. No. 15/824,340, entitled "Non-Interactive Information Dispersal", filed Nov. 28, 2017, 35 Pages.

Pending U.S. Appl. No. 15/405,004, entitled "Mapping Storage of Data in a Dispersed Storage Network", filed Jan. 12, 2017, 148 Pages.

Pending U.S. Appl. No. 15/804,424, entitled "Deterministically Determining Affinity for a Source Name Range", filed Nov. 6, 2017, 30 Pages.

Pending U.S. Appl. No. 15/805,280, entitled "Preventing Multiple Round Trips When Writing to Target Widths", filed Nov. 7, 2017, 30 Pages.

* cited by examiner

SLICE-EMBEDDED OBJECT METADATA

BACKGROUND

The present invention relates, generally, to the field of computer networks, and more specifically, to dispersed or cloud storage of object data.

Object storage is a computer data storage architecture that manages data as objects, as opposed to other storage architectures such as file systems and block storage. In an object storage architecture, each object typically includes the data, a variable amount of metadata, and a unique identifier. Object storage may be implemented at the device level, the system level, and the interface level. Object storage seeks to enable capabilities not addressed by other storage architectures, for example, application programming interfaces (APIs) that may be directly programmable by an application manipulating data, a namespace that may span multiple physical devices, and data management functions such as data replication and data distribution.

BRIEF SUMMARY

An embodiment of the invention may include a method, computer program product and system for object data storage. The embodiment may include receiving a data object for storage within a set of dispersed storage units. The data object may include object data and associated object metadata. The embodiment may include replicating the object metadata of the received data object to create more than one copy of the associated object metadata. The embodiment may include encoding the received data object to produce a plurality of data slices. The encoding may include dispersed storage error encoding. The embodiment may include appending a copy of the associated object metadata to each data slice within the plurality of data slices. The embodiment may include transmitting the plurality of data slices to the set of dispersed storage units.

DETAILED DESCRIPTION

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. Moreover, a computer may use "cloud storage" as part of its memory system. As is known, cloud storage enables a user, via its computer, to store files, applications, etc. on a remote or Internet storage system. The remote or Internet storage system may include a dispersed storage system that uses an error correction scheme (e.g., erasure coding) to encode data for storage.

Erasure coding (EC) may be useful with large quantities of data and in applications/systems (e.g., distributed storage applications, object stores) which need to tolerate failures. EC is a method of data protection in which a data object (i.e., data and metadata) is broken into smaller fragments (segments). Each segment is then mathematically encoded in order to generate a number of slices. Finally, the slices are stored across a set of different locations (stores) or storage media. Breaking the data object into smaller segments in order to generate slices, and storing the slices in different locations provides redundancy since the data object segment can be recovered from some threshold number of the slices. For example, a data object may be broken down into 4 MB segments. Each 4 MB segment may be erasure coded into 16 slices stored in 16 different locations. Furthermore, the threshold number of slices needed to recover a 4 MB segment of object data may be 10. Therefore, in this example, any 10 of the 16 slices, stored in 16 different locations, may be used to restore the 4 MB segment. The benefit of EC is that the 10 nearest locations, the 10 fastest locations, or the 10 remaining locations (in the event 6 locations are lost) may be used to recover the 4 MB segment.

However, a challenge remains in that an individual slice of object data does not contain useful information on its own. Although this attribute may be beneficial for security, when combined with cryptography, it nevertheless limits the potential actions of the individual store in which the slice is located. A store may wish to perform some local action against the object stored at that location, such as enforcing data tiering or lifecycle policies, processing data object deletion, or enforcing data object access control lists (ACLs). Yet, a problem exits in that the individual store does not have enough information (i.e., a full copy of a data object's metadata) locally to perform such actions since the object was erasure coded. Typically, object metadata is erasure coded in the same way as the object data resulting in slices containing a piece of object metadata but not enough to interpret the object data and take some action. Before an action can be performed locally, multiple distributed lookups (i.e., reads) from a threshold number of stores (i.e., enough to satisfy the threshold number of slices) must be performed so that the metadata may be recovered. Such an undertaking is expensive as it entails a lot of network traffic and results in higher latency for the action requester.

Embodiments of the present invention may include a dispersed storage (DS) system 100, described below, which provides a method for replicating a data object's metadata and storing a copy of the metadata along with each erasure coded slice of that data object within the individual stores, thereby allowing for the first read of a slice to provide a copy of the metadata which is visible and interpretable by the local stores. DS system 100 may allow an individual store to locally scan object metadata in conjunction with an erasure coded data slice and enable the individual store to execute potential operations such as deleting all segments of an object or object region (the store can read the metadata from its slice to determine all the related slices that need to be deleted), access control enforcement (the store can read ACL information in the metadata to enforce more fine-grained access control restrictions regarding who is authorized to read, update, or delete the slice or related slices), and prefetching of related objects (the access request might indicate to return not just the requested slice, but any/all related slices as well). Related slices might include related segments, index information, intents, etc.

Embodiments of the present invention will now be described in detail with reference to the accompanying Figures.

Figure 1:
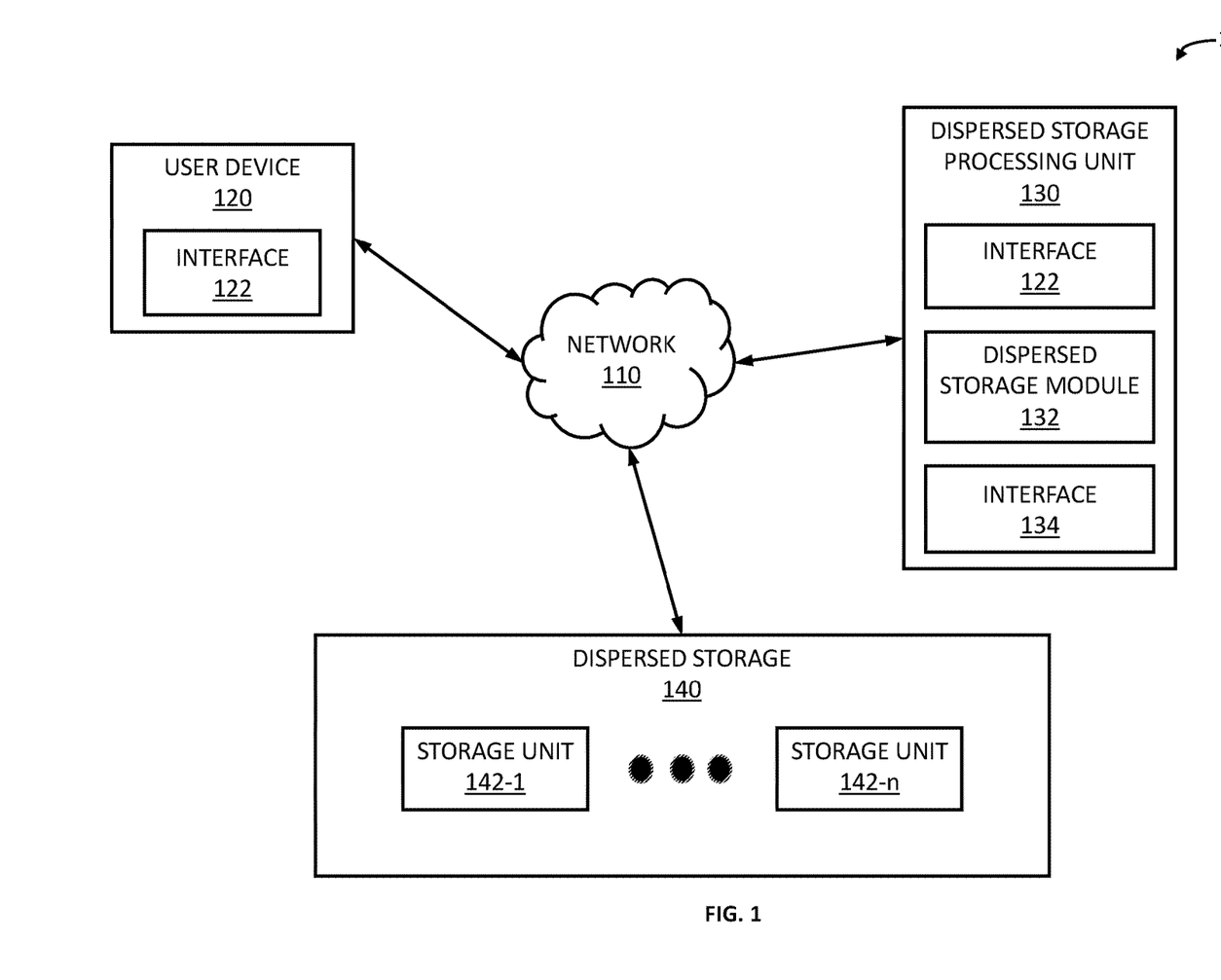
FIG. 1 is a block diagram illustrating a dispersed storage (DS) system, in accordance with an embodiment of the present invention.

FIG. 1 is a functional block diagram illustrating dispersed storage system 100, in accordance with an embodiment of the present invention. In an example embodiment, dispersed storage system 100 may include user device 120, dispersed storage processing unit 130, and dispersed storage 140, all interconnected via network 110.

DS system 100 may be operable to support dispersed storage error encoded object data storage and retrieval, to support distributed task processing on received object data, and/or to support distributed task processing on stored object data. In general, and with respect to dispersed storage error encoded object data storage and retrieval, object data may be encoded (i.e., EC), stored in distributed locations, and subsequently retrieved in a reliable and secure manner. DS system 100 may be tolerant of a significant number of storage unit failures (the number of failures is based on parameters of the dispersed storage error encoding function) without loss of object data and without the need for a redundant or backup copies of the data. Further, the DS system 100 may store object data for an indefinite period of time without data loss and in a secure manner (e.g., the system is resistant to unauthorized attempts at accessing or hacking the data).

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support communications between user device 120, dispersed storage processing unit 130, and dispersed storage 140.

In an example embodiment, user device 120 may include interface 122. Client computer 120 may be a laptop computer, a notebook, a tablet computer, a netbook computer, a personal computer (PC), a desktop computer, a personal digital assistant (PDA), a smart phone, a mobile phone, a virtual device, a thin client, or any other electronic device or computing system capable of receiving and sending data from and to other computing devices such as dispersed storage processing unit 130, via network 110, and capable of supporting the functionality required of embodiments of the invention. While user device 120 is shown as a single device, in other embodiments, user device 120 may be comprised of a cluster or plurality of computing devices, working together or working separately. User device 120 may be described generally with respect to FIG. 3 below. In an example embodiment, user device 120 may send, via interface 122, a data object to dispersed storage processing unit 130 for storage within dispersed storage 140.

In an example embodiment, interface 122 and 134 may be a program, or subroutine contained in a program, that may operate to support one or more communication links via the network 110 indirectly and/or directly. For example, interface 122 supports a communication link (e.g., wired, wireless, direct, via a LAN, via the network 24, etc.) between user device 120 and dispersed storage processing unit 130. As another example, interface 134 supports communication links (e.g., a wired connection, a wireless connection, a LAN connection, and/or any other type of connection to/from the network 24) between dispersed storage processing unit 130 and dispersed storage 140. In an example embodiment, interface 122 may operate to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, interface 122 may attach a user identification code (ID) to a data object.

In an example embodiment, dispersed storage 140 includes a plurality of storage units 142-1 to 142-n (DS storage units) that may be located at geographically different sites (e.g., one in Chicago, one in Milwaukee), at a common site, or a combination thereof. For example, if dispersed storage 140 includes eight storage units 142, each storage unit may be located at a different site. As another example, if dispersed storage 140 includes eight storage units 142, all eight storage units may be located at the same site. As yet another example, if dispersed storage 140 includes eight storage units 142, a first pair of storage units may be located at a first common site, a second pair of storage units may be located at a second common site, a third pair of storage units may be located at a third common site, and a fourth pair of storage units may be located at a fourth common site. Note that dispersed storage 140 may include more or less than eight storage units 142.

In an example embodiment, each of the DS storage units, within dispersed storage 140, may operate to store dispersed error encoded object data and/or to execute, in a distributed manner, one or more tasks on object data. Each of storage units 142-1 to 142-n may be a desktop computer, a notebook, a laptop computer, a blade server, a networked computer appliance, a virtual device, a thin client, or any other networked electronic device or computing system capable of receiving and sending data from and to other computing devices such as dispersed storage processing unit 130, via network 110, and capable of supporting the functionality required of embodiments of the invention. Furthermore, each of storage units 142-1 to 142-n may be described generally with respect to FIG. 3 below.

In an example embodiment, dispersed storage processing unit 130 may include interface 122, dispersed storage module 132, and interface 134. Dispersed storage processing unit 130 may be a desktop computer, a notebook, a laptop computer, a blade server, a networked computer appliance, a virtual device, a thin client, or any other networked electronic device or computing system capable of receiving and sending data from and to other computing devices such as user device and dispersed storage 140, via network 110, and capable of supporting the functionality required of embodiments of the invention. In an example embodiment, dispersed storage processing unit 130 may function as a dispersed storage processing agent for user device 120. While dispersed storage processing unit 130 is shown as a single device, in other embodiments, dispersed storage processing unit 130 may be comprised of a cluster or plurality of computing devices, working together or working separately. Dispersed storage processing unit 130 may be described generally with respect to FIG. 3 below.

In an example embodiment, dispersed storage module 132 may be a program, or subroutine contained in a program, that may operate to dispersed storage error encode/decode (i.e., erasure coding) object data and metadata (e.g., a data object received from user device 120, via interface 122). In an example embodiment, dispersed storage module 132 may also operate to fully replicate a data object's metadata and append a complete copy of the replicated metadata to every data slice generated by the erasure coding of that data object. In another embodiment, dispersed storage module 132 may append a complete copy of the replicated metadata to at least the slices of the first segment of a multi-segmented data object. Furthermore, in an example embodiment, dispersed storage module 132 may operate to transmit the plurality of data slices, each containing a complete copy of the replicated metadata, to dispersed storage 140 for storage within storage unit 142-1 to 142-n. In an example embodiment, dispersed storage module 132 dispersed storage error encodes (i.e., erasure codes) a data object on behalf of user device 120 for storage within dispersed storage 140. The operations and functions of dispersed storage module 132 are described in further detail below with regard to FIG. 2.

Figure 2:
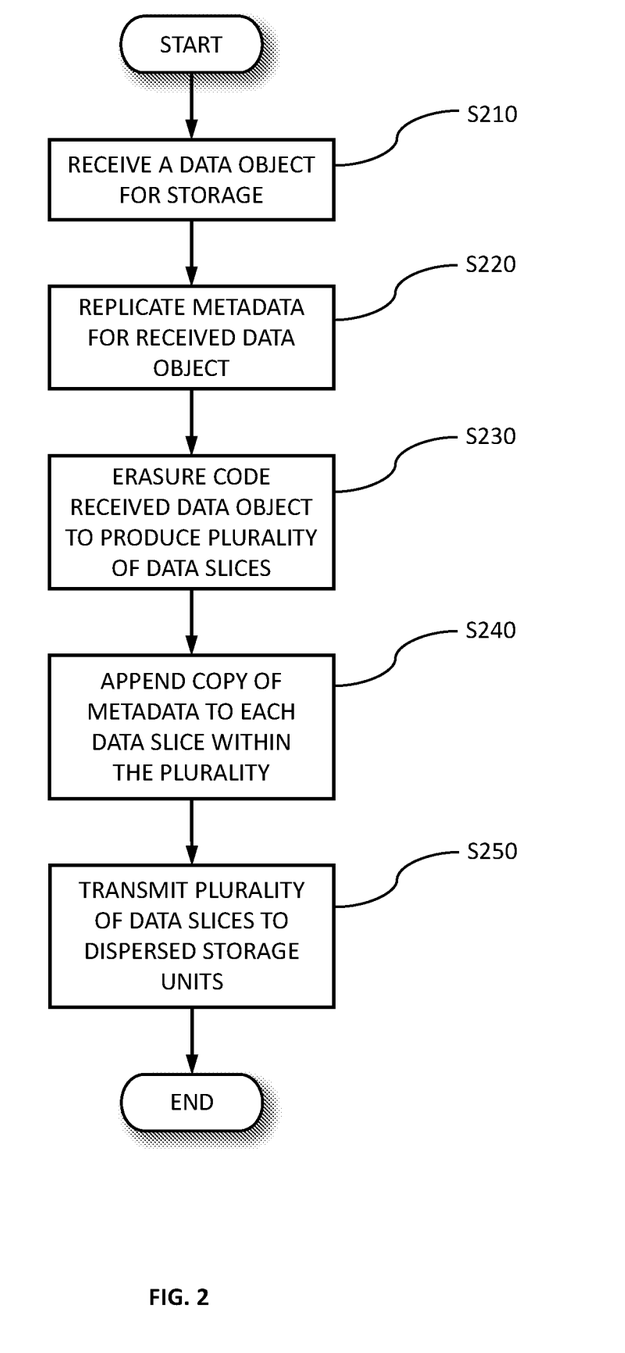
FIG. 2 is a flowchart illustrating the operations of the dispersed storage client module of FIG. 1, in accordance with an embodiment of the invention.

FIG. 2 shows a flowchart illustrating the operations of dispersed storage module 132 in accordance with an example embodiment of the invention. Referring to step S210, dispersed storage module 132 may receive, via interface 122 and network 110, a write data object request that includes a data for storage and may include a data name. The data may include one of a data object, a plurality of data objects, a data segment of the data object (e.g., where the data is divided into a plurality of segments utilizing a segmentation scheme), and a group of data segments of the data object. The data may also include associated metadata (e.g., system metadata and user-defined metadata) which may identify properties of the data and may specify how the data should be handled when it is accessed. For example, properties of the data may include access control lists or other authorization information, content type, and timestamps (e.g., creation timestamps, modification timestamps). Moreover, user-defined metadata may be anything (e.g., artist/album for media, GPS coordinates for photos). In an example embodiment, dispersed storage module 132 receives a data object, with associated object metadata, from user device 120, via interface 122 and network 110.

Referring to step S220, dispersed storage module 132 may replicate object metadata associated with a received data object. The entirety of object metadata associated with a received data object is replicated. Typically, metadata is much more compact than data, and thus replicating metadata does not cost very much in terms of disk space utilization. In an example embodiment, dispersed storage module 132 replicates the object metadata associated the data object received in step S210.

Referring to step S230, dispersed storage module 132 may erasure code (i.e., dispersed storage error encode), in accordance with a dispersed storage error encoding process based on dispersed storage error encoding parameters, a received data object to produce a plurality of data slices. In erasure coding the received data object, dispersed storage module 132 may ascertain (e.g., determines, utilizes pre-established parameters, accesses fixed parameters, reads programmable parameters, performs a table look up, utilizes user selected parameters, etc.) dispersed storage error encoding parameters for encoding the data object. The dispersed storage error encoding parameters may include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values may include a total, or width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.). In an example embodiment, dispersed storage module 132 may erasure code the data object received in step S210 to produce a plurality of data slices.

Referring to step S240, dispersed storage module 132 may append a copy of the replicated object metadata to each data slice within the plurality of data slices. The metadata copy is appended to the data slice in a known position so that a storage device (e.g., DS storage units) can identify and read the replicated metadata portion. The data slice has an opaque data portion, a format, and some configuration data (e.g., a list of codecs that were applied to that data slice). The replicated metadata is additional to these items, for instance, it might be prepended to the slice data.

Referring to step S250, dispersed storage module 132 may transmit the plurality of data slices to the dispersed storage units. Dispersed storage module 132 may output the plurality of data slices, for example by issuing write slice requests to the DS storage units. In an example embodiment, dispersed storage module 132 may transmit, via interface 134 and network 110, the plurality of data slices to dispersed storage 140 for storage within storage units 142-1 to 142-n.

Figure 3:
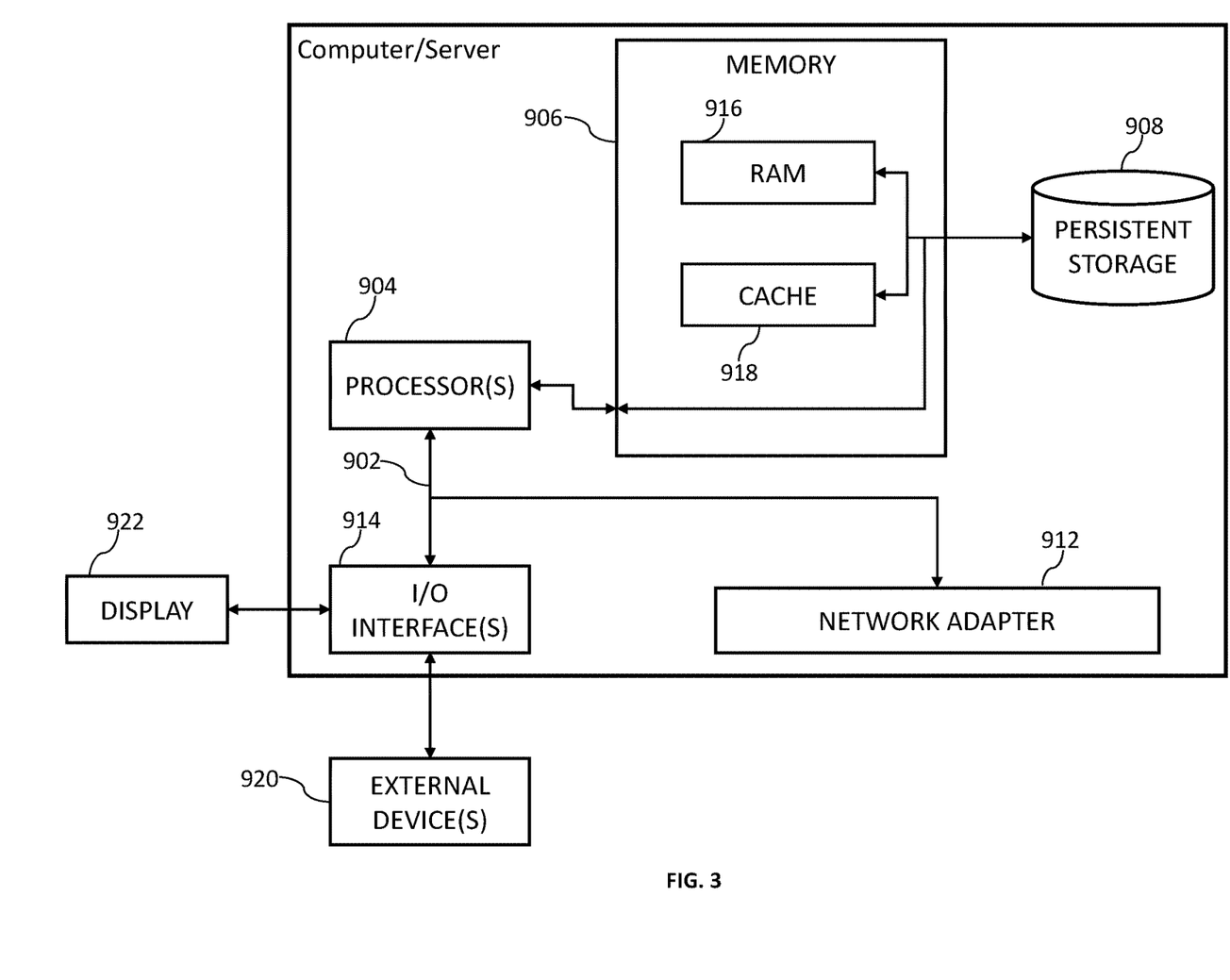
FIG. 3 is a block diagram depicting the hardware components of the dispersed storage system of FIG. 1, in accordance with an embodiment of the invention.

FIG. 3 depicts a block diagram of components of user device 120, dispersed storage processing unit 130, and storage units 142-1 to 142-n, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

User device 120, dispersed storage processing unit 130, and storage units 142-1 to 142-n include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs interface 122, in user device 120; and interface 122, interface 134, and dispersed storage module 132 in dispersed storage processing unit 130 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs interface 122, in user device 120; and interface 122, interface 134, and dispersed storage module 132 in dispersed storage processing unit 130 may be downloaded to persistent storage 908 through network adapter 912.

I/O interface(s) 914 allows for input and output of data with other devices that may be connected to user device 120, dispersed storage processing unit 130, and storage units 142-1 to 142-n. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs interface 122, in user device 120; and interface 122, interface 134, and dispersed storage module 132 in dispersed storage processing unit 130, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
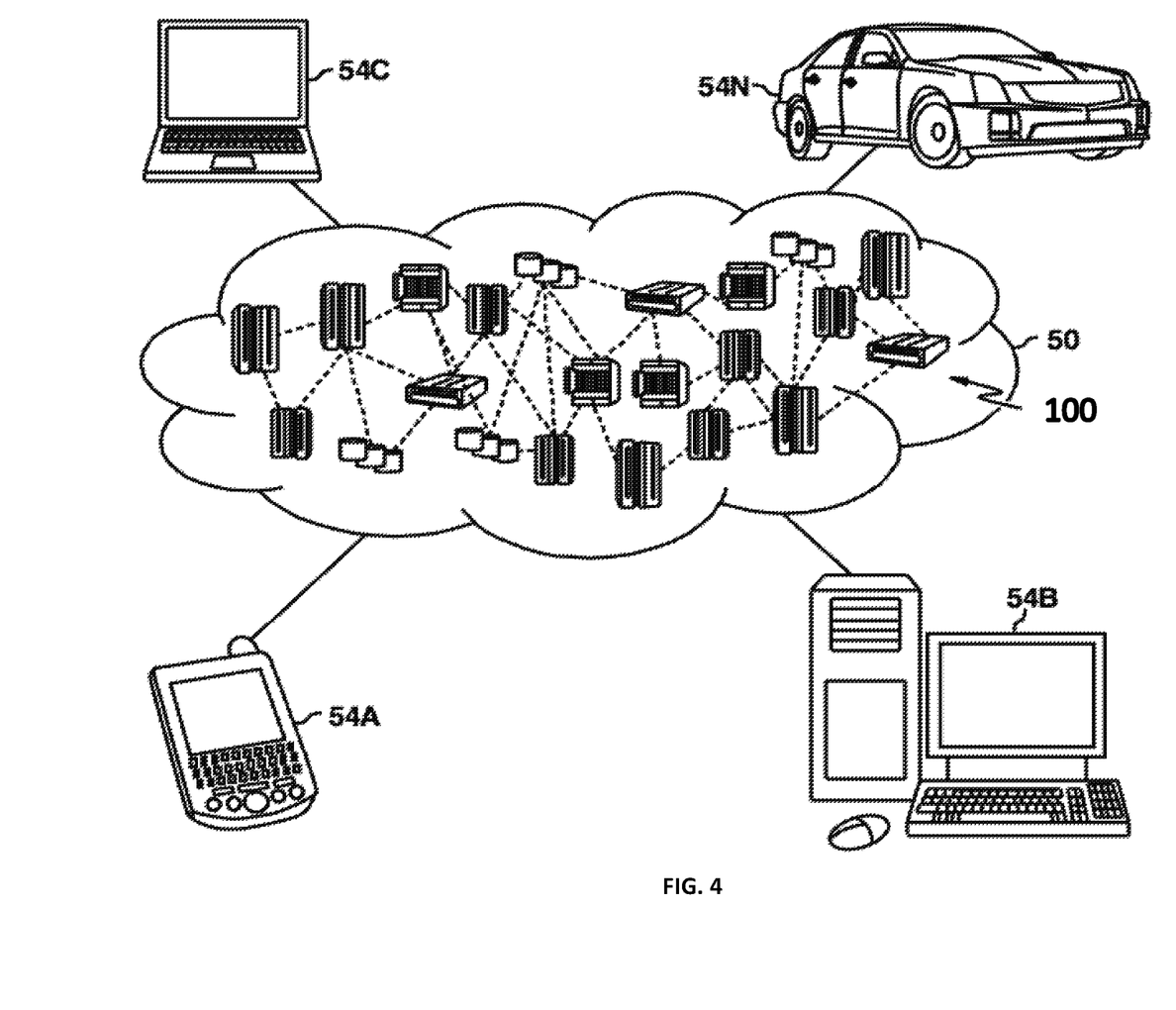
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
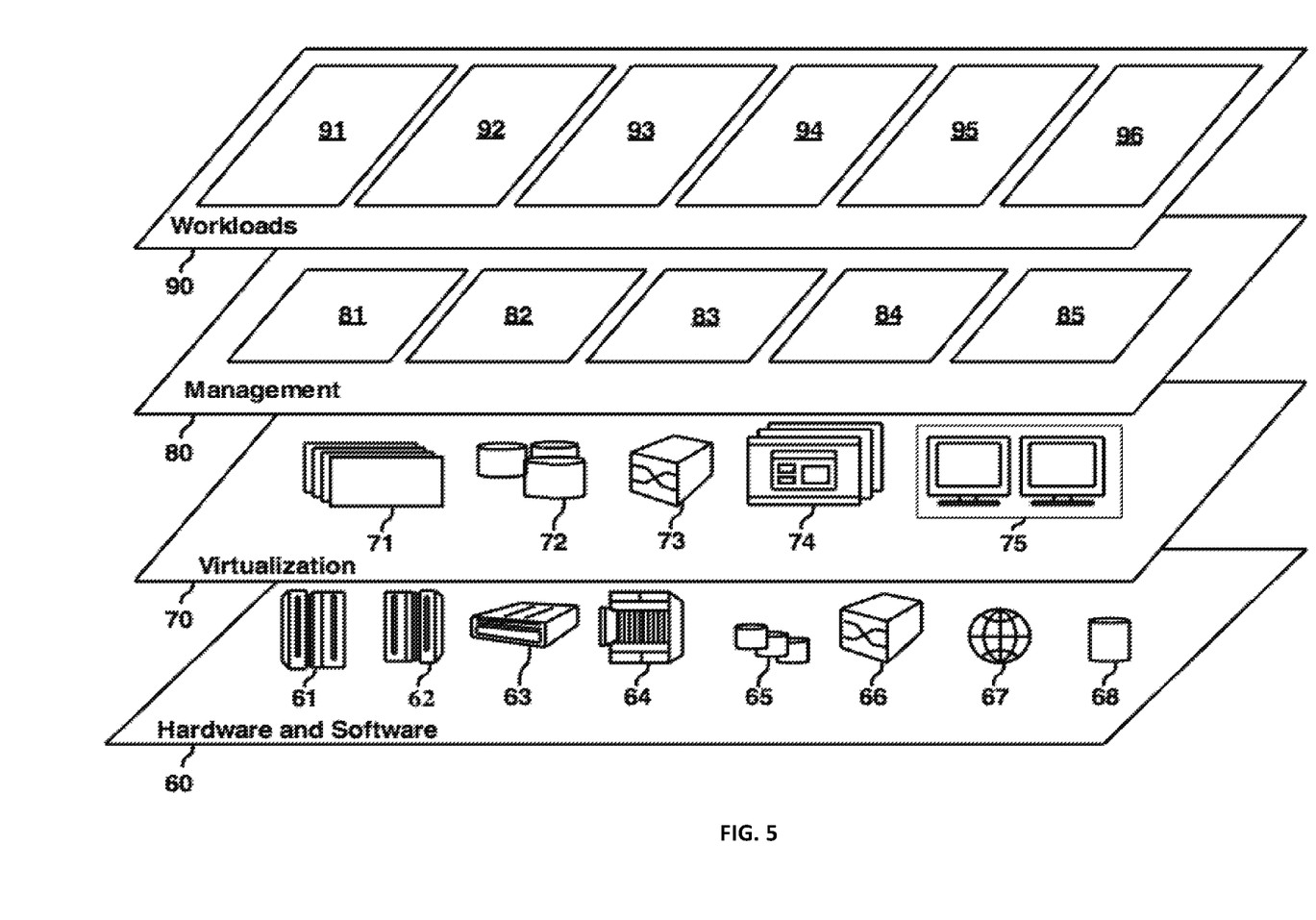
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dispersed storage system 96. Dispersed storage system 96 may relate to implementing a dispersed storage framework for object data within a cloud computing environment.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for object data storage, the method comprising:
    receiving a data object for storage within a set of dispersed storage units, wherein the data object comprises object data and associated object metadata;
    replicating the associated object metadata of the received data object to create more than one copy of the associated object metadata;
    dispersed storage error encoding the received data object to produce a plurality of data slices, wherein dispersed storage error encoding comprises erasure coding;
    appending a copy of the associated object metadata to each data slice within the plurality of data slices; and transmitting the plurality of data slices to the set of dispersed storage units.

2. The method of claim 1, wherein dispersed storage error encoding is implemented utilizing dispersed storage error encoding parameters.

3. The method of claim 2, wherein the dispersed storage error encoding parameters comprise an element from the group consisting of an encoding function, a data segmenting protocol, per data segment encoding values, and slice security information.

4. The method of claim 1, wherein the copy of the associated object metadata is appended in a known position.

5. The method of claim 1, wherein the plurality of data slices is transmitted to the set of dispersed storage units via data slice write requests issued to the set of dispersed storage units.

6. The method of claim 1, wherein the copy of the associated object metadata is appended to each data slice of a first segment of a multi-segmented data object, and wherein each segment of the multi-segmented data object is dispersed storage error encoded.

7. A computer program product for object data storage, the computer program product comprising:
one or more computer-readable tangible storage devices and program instructions stored on at least one of the one or more computer-readable tangible storage devices, wherein the one or more computer-readable tangible storage devices are not a transitory signal per se, and wherein the program instructions are executable by a computer, the program instructions comprising:
program instructions to receive a data object for storage within a set of dispersed storage units, wherein the data object comprises object data and associated object metadata;
program instructions to replicate the associated object metadata of the received data object to create more than one copy of the associated object metadata;
program instructions to dispersed storage error encode the received data object to produce a plurality of data slices, wherein program instructions to dispersed storage error encode comprises program instructions for erasure coding;
program instructions to append a copy of the associated object metadata to each data slice within the plurality of data slices; and
program instructions to transmit the plurality of data slices to the set of dispersed storage units.

8. The computer program product of claim 7, wherein dispersed storage error encoding is implemented utilizing dispersed storage error encoding parameters.

9. The computer program product of claim 8, wherein the dispersed storage error encoding parameters comprise an element from the group consisting of an encoding function, a data segmenting protocol, per data segment encoding values, and slice security information.

10. The computer program product of claim 7, wherein the copy of the associated object metadata is appended in a known position.

11. The computer program product of claim 7, wherein the plurality of data slices is transmitted to the set of dispersed storage units via data slice write requests issued to the set of dispersed storage units.

12. The computer program product of claim 7, wherein the copy of the associated object metadata is appended to each data slice of a first segment of a multi-segmented data object, and wherein each segment of the multi-segmented data object is dispersed storage error encoded.

13. A computer system for object data storage, the computer system comprising:
one or more processors, one or more computer-readable memories, one or more computer-readable tangible storage devices, and program instructions stored on at least one of the one or more computer-readable tangible storage devices, wherein the program instructions are executable by at least one of the one or more processors via at least one of the one or more memories, the program instructions comprising:
program instructions to receive a data object for storage within a set of dispersed storage units, wherein the data object comprises object data and associated object metadata;
program instructions to replicate the associated object metadata of the received data object to create more than one copy of the associated object metadata;
program instructions to dispersed storage error encode the received data object to produce a plurality of data slices, wherein program instructions to dispersed storage error encode comprises program instructions for erasure coding;
program instructions to append a copy of the associated object metadata to each data slice within the plurality of data slices; and
program instructions to transmit the plurality of data slices to the set of dispersed storage units.

14. The computer system of claim 13, wherein dispersed storage error encoding is implemented utilizing dispersed storage error encoding parameters.

15. The computer system of claim 14, wherein the dispersed storage error encoding parameters comprise an element from the group consisting of an encoding function, a data segmenting protocol, per data segment encoding values, and slice security information.

16. The computer system of claim 13, wherein the copy of the associated object metadata is appended in a known position.

17. The computer system of claim 13, wherein the plurality of data slices is transmitted to the set of dispersed storage units via data slice write requests issued to the set of dispersed storage units.

* * * * *